Jan. 10, 1956  V. OSWALT  2,730,253
TRIP MEANS FOR FRUIT LOADING BOX
Filed April 6, 1953  2 Sheets-Sheet 1

INVENTOR.
VICK OSWALT
BY
Jennings & Carter
ATTORNEYS

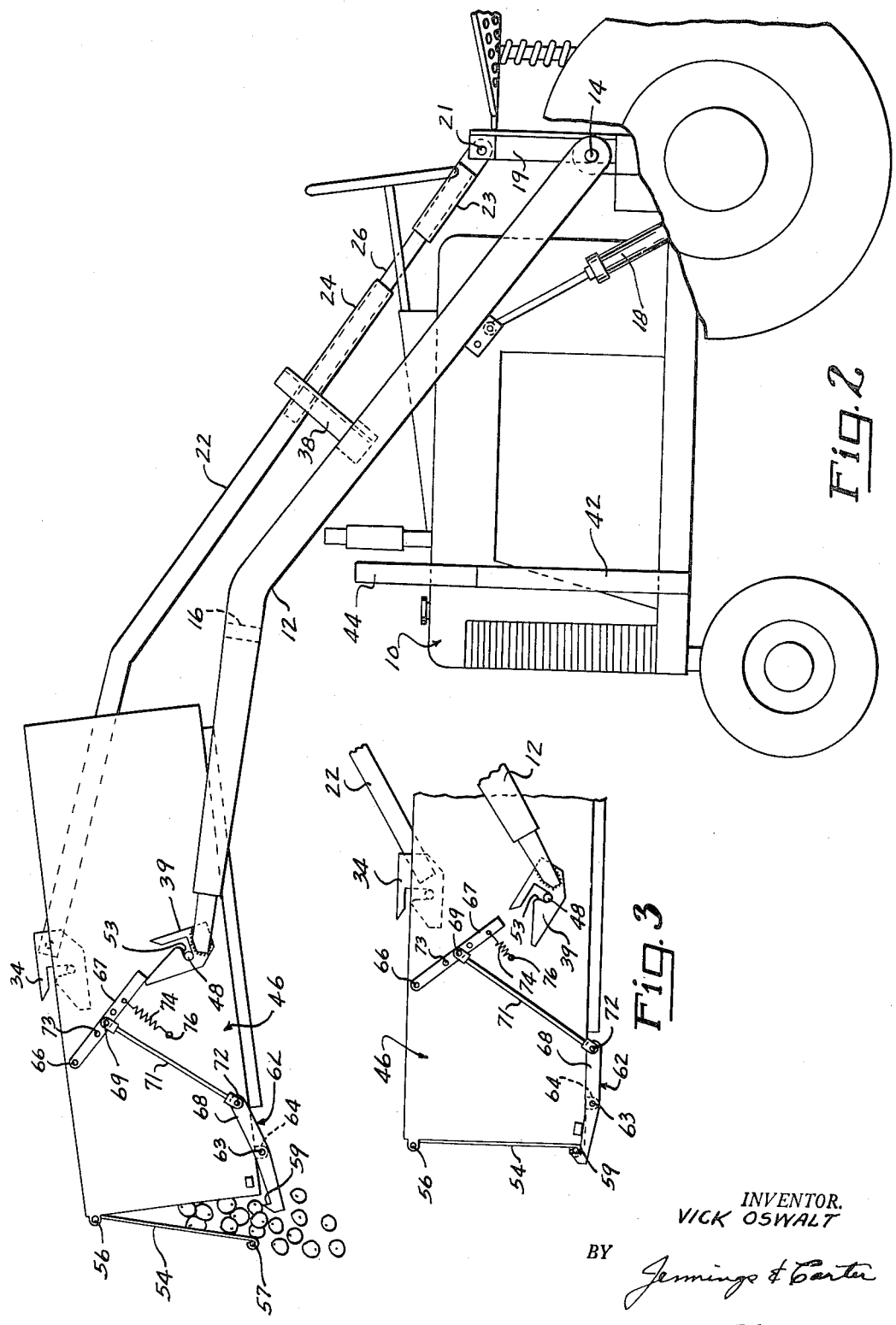

2,730,253

TRIP MEANS FOR FRUIT LOADING BOX

Vick Oswalt, Clermont, Fla.

Application April 6, 1953, Serial No. 347,110

4 Claims. (Cl. 214—304)

This invention relates to trip means for fruit loading boxes and is an improvement over the apparatus disclosed in my copending application, Serial No. 313,760, filed October 8, 1952, relating to Material Handling Apparatus.

In accordance with the invention described in my above mentioned application, I utilize a tractor vehicle which is equipped with a pair of hydraulically operated lifting arms. Hook members are provided adjacent the free ends of the lift arms for detachably engaging a receptacle capable of holding around ten boxes of fruit whereby to raise and transport the receptable from the grove to a waiting truck or trailer, and there raise it further for emptying. Also, a hinged end is provided on the receptacle with a latch which must be tripped at the time the container is emptied.

In accordance with my present invention I provide improved means for automatically tripping the latch at the end of the receptacle when the free ends of the lift arms are raised and the receptacle is tilted for emptying, thus permitting the apparatus to be more easily operated by one man seated on the tractor.

The prime object of my invention is to provide trip means for fruit loading receptacles of the character designated which shall be simple of construction, economical of manufacture and which shall greatly reduce time and labor heretofore required in the harvesting of citrus fruit.

Apparatus embodying features of my invention is shown in the accompanying drawings forming a part of this application in which:

Fig. 2 is a view similar to Fig. 1 taken from the opposite side, showing the lift arms in raised position and the receptacle partially tilted; and, Fig. 3 is a side elevational view of the receptacle, showing the position of the trip mechanism while the receptacle is in lowered position for loading and transporting.

Figure 1:
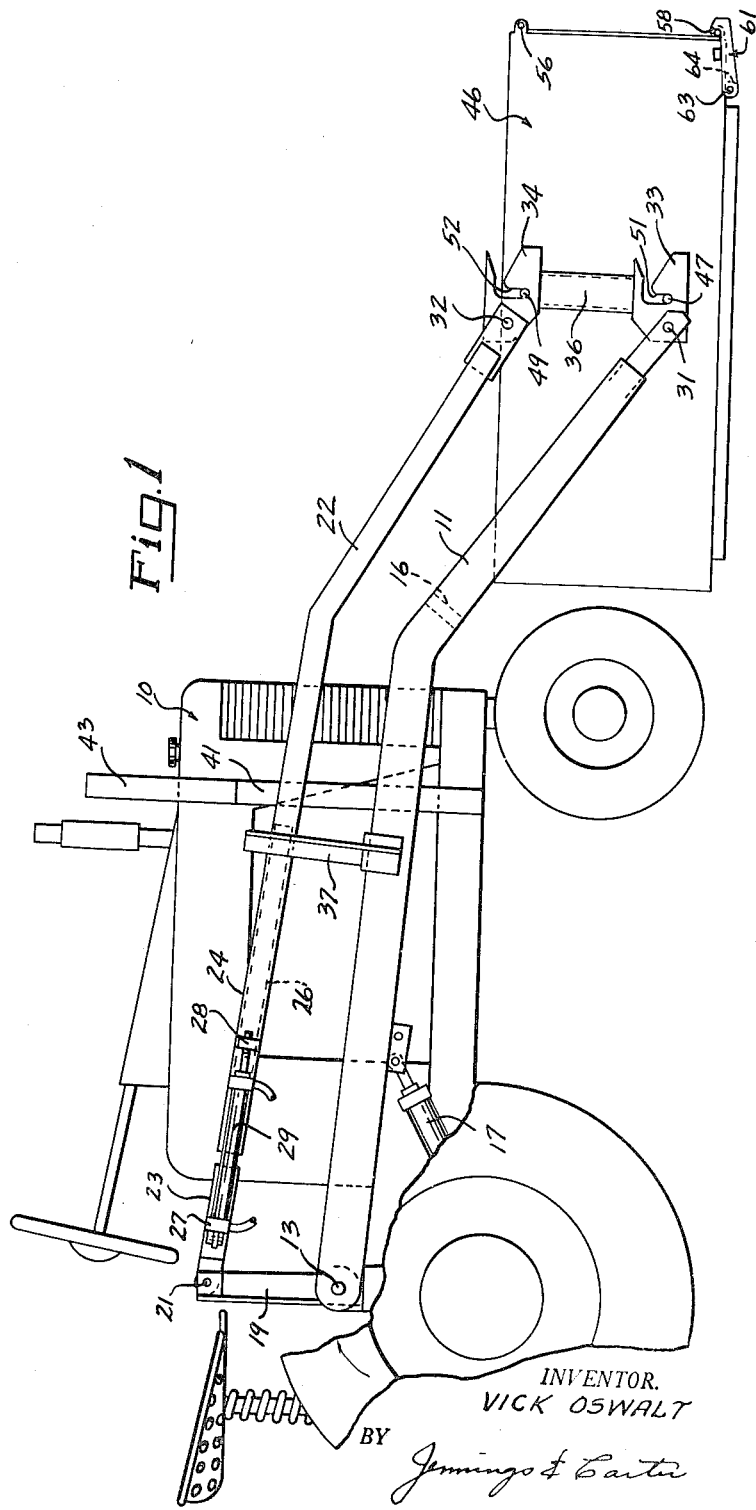
Fig. 1 is a side elevational view showing the tractor vehicle and receptable in lowered position.

Referring now to the drawings for a better understanding of my invention I show a tractor vehicle 10 having lift arms 11 and 12 which are pivoted to the frame of the vehicle at 13 and 14. The arms 11 and 12 are joined together by a suitable cross member 16 and are raised and lowered by means of hydraulic cylinders 17 and 18 in a manner well understood.

Mounted on the tractor 10 and extending upwardly above the rear of the arm 11 is a rigid vertical member 19 to which is pivotally connected at 21, a tilting and leveling arm 22. The tilting and leveling arm 22 comprises two hollow sections 23 and 24. A stiffening member 26 is welded or otherwise rigidly secured in the section 23 while the section 24 is adapted to slide outwardly and inwardly with respect to the member 26. Mounted on the section 23 is a bracket 27 and mounted on the section 24 is a bracket 28. Connecting the bracket 26 and 28 is a hydraulic cylinder 29 which is adapted to extend or retract the section 24 thereby to elongate or retract the leveling and tilting arm 22. The lifting arm 11 and the leveling and tilting arm 22 are both pivotally connected at their forward ends, as shown at 31 and 32, to forwardly opening hook members 33 and 34, which, in turn, are rigidly connected to a common vertically extending connecting member 36. The member 36 maintains the hook member in a fixed spaced relation and causes the arms 11 and 22 to move together. Mounted on the arm 11 are guide members 37 and 38 between which the arm 22 is adapted to move and which serves to stabilize the arm in its operation.

Rigidly mounted at the forward end of the arm 12 is a forwardly opening receptacle-engaging hook 39 which is similar to, and directly opposite, the hook 33 at the outer end of the lift arm 11. It will be seen that when the lift arms 11 and 12 are in their lowered positions, the hook 39 will assume a position corresponding to and directly opposite the hook 33.

To eliminate side sway of the arms 11 and 12 when transporting a receptacle, I provide a guide frame having side members 41 and 42 which are rigidly secured to the tractor frame and engage the arms 11 and 12 when raised a short distance off the ground, as when transporting the receptacle. The members 41 and 42 are joined at their upper ends by two members 43 and 44 which are joined together at their upper ends in the form of an inverted V to guide the arms 11 and 12 in their downward movement after having been raised to their uppermost position.

The material handling receptacle is indicated generally at 46 and is of the size to fit between the lift arms 11 and 12 and is capable of holding approximately 10 boxes of citrus fruit. Lift pins 47 and 48 are provided on the sides of the receptacle 46 midway the ends thereof and below the center of gravity of the receptacle. On the side of the receptacle 46 directly above the pin 47, in position to be engaged by the hook 34, I provide a leveling and tilting pin 49. The pins 47 and 49 are spaced from each other a distance equal to the distance between the hook members 33 and 34. Accordingly, when the receptacle 46 is resting on the ground, as shown in Fig. 1, the pins 47, 48 and 49 may be engaged by the hooks on the arms 11, 12 and 22, by a forward movement of the arms. The hooks 33, 34 and 39 are provided with downwardly opening slots 51, 52 and 53 respectively whereby, when the pins 47, 49 and 48 have been engaged by their hook members and the arms are moved upwardly slightly, the pins are engaged with the hook members and held against accidental displacement.

In order that the receptacle 46 may be readily emptied, I hinge one end, as shown at 54, by means of a pivot rod 56 which extends entirely across that end of the receptacle so that the end 54 may swing outwardly as shown in Fig. 2. Extending across the lower edge of the end 54 is a rod 57 which engages behind upwardly projecting detents 58 and 59 provided on latch members 61 and 62 when the receptacle is closed as shown in Figs. 1 and 3. The latch members 61 and 62 are rigidly mounted on a cross rod or shaft 63 which extend across beneath the receptacle 46 and is adapted to rotate in suitable bearings 64.

The apparatus described hereinabove constitutes the subject matter of my above mentioned application. My present invention embodies means for automatically tripping the latch members 61 and 62 when the receptacle 46 is raised and tilted by the arm 22. Pivotally mounted on the side of the receptacle 46 above the pin 48, as at 66 is a downwardly extending link 67. The lower end of the link 67 is in position to be engaged by the outer end of the hook member 39, which is rigidly secured to the free end of the lift arm 12, when the receptacle 46 is moved to the raised position and tilted, as shown in Fig. 2. The latch member 62 is provided with a rearwardly extending portion 68. Pivotally connected to the link member 67 intermediate the end thereof by means of a pin 69 is one end of a link member 71. The other end of the link member 71 is pivotally connected to the rear end of the latch member 62 by means of a pivot pin 72. A plurality of openings 73 are provided in the link member 67 whereby the position of the link 67 with respect to the outer end of the hook member 39 may be adjusted, thus permitting the hook member to engage the link 67 at different degrees of tilt of the receptacle 46. The latch member 62 is urged toward locked position by means of a tension spring 74 which is connected at its upper end to the link 67 intermediate the pin 69 and the free end thereof. The lower end of the spring 74 is connected to an outwardly projecting lug 76 on the side of the receptacle 46.

Due to the fact that the receptacle 46 remains level during the raising thereof, the hook member 39 moves with relation to the receptacle from the position shown in Fig. 3 to the position shown in Fig. 2. When the receptacle 46 is tilted by means of the arm 22 the outer end of the hook member 39 engages the lower end of the link 67. The exact point at which the hook member 39 will engage the link 67 is determined by positioning the pin 69 in a suitable opening 73. As the link member 67 is moved in a counter-clockwise direction about the pivot pin 66 the link 71 raises the rear end 68 of the latch member 62, thereby lowering the detents 58 and 59 and releasing the end 54 of the receptacle.

From the foregoing description the operation of my improved apparatus will be readily understood. The receptacles 46 are distributed through a grove being picked convenient to the pickers. When a receptacle is filled the tractor moves forward with its lift arms and leveling and tilting arm lowered in position to engage the pins 47, 48 and 49. The pins are readily received into the forwardly opening hooks 33, 34 and 39 and the receptacle is raised by means of the hydraulic cylinders 17 and 18. The pins 47, 48 and 49 rest in their downwardly opening slots 51, 53 and 52 so that the receptacle does not become displaced as the receptacle is being transported. To transport the receptacle through the grove, the receptacle is raised only a short distance above the ground and is maintained in a level position by means of the arm 22. When the unloading point is reached, the lift arms 11 and 12 are raised thus lifting the receptacle 46 to the position shown in Fig. 2 of the drawing. Hydraulic fluid is then admitted to the cylinder 29 to extend the arm 22 and tilt the receptacle 46. As the receptacle is tilted, the lower end of the link 67 engages the outer end of the the hook member 39. The link 71 is thus pulled upwardly and rearwardly by the link 67 thereby lowering the forward end of the latch member 62 and disengaging the rod 57 from the detents 58 and 59, whereupon the contents of the receptacle are discharged. The receptacle is then leveled by retracting the arm 22 and is lowered and reconveyed to a point convenient to the pickers.

From the foregoing it will be seen that I have devised improved trip means for fruit loading receptacles which is simple of construction, economical of manufacture and effective to release the latch at the end of the receptacle when the same is tilted, thus permitting the apparatus to be easily operated by a single person on a tractor.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In combination with a vehicle having power operated lift arms, a receptacle having laterally extending lift pins, a pivoted door at one end of the receptacle, a latch for the door, hook members on the lift arms for detachably engaging the lift pins, means maintaining the receptacle level as it is lifted, means operable from the vehicle for tilting the receptacle, and latch release means mounted on the receptacle operatively connected to said latch and operable responsive to tilting the receptacle to release the latch and hold it in released position.

2. In apparatus for lifting and dumping material handling receptacles having a pivoted door at one end thereof which is held in closed position by a latch, a pair of power operated lift arms disposed in side by side spaced relation, receptacle engaging members at the free ends of the lift arms one of which is rigidly mounted on its lift arm, means maintaining said receptacle level while it is being lifted, means operable from the vehicle for tilting the receptacle, a link pivotally connected at one end to a side of the receptacle with the free end of said link in position to be engaged by said receptacle engaging member which is rigidly mounted on its lift arm upon tilting the lifted receptacle, and means connecting said link to said latch whereby the latch is released and held in released position upon engagement of said link with the receptacle engaging member.

3. In combination with a vehicle having power operated lift arms, a dump box having laterally extending lift pins, a door pivotally mounted at its upper end to one end of the box, a latch pivotally mounted adjacent the lower end of said box for releasably holding said door in closed position, forwardly opening hook members on the lift arms for detachably engaging the lift pins, means operable from the vehicle for tilting a lifted box to dump it, a link pivotally connected at one end to a side of said box with the free end of said link in position to be engaged by one of said hook members when the box is tilted, and a second link pivotally connected at one end to said first mentioned link intermediate the ends thereof and pivotally connected at its other end to the latch for releasing the same and holding it in released position during engagement of said first mentioned link with the hook member.

4. In combination with a vehicle having power operated lift arms, a dump box having laterally extending lift pins, a door pivotally mounted at its upper end to one end of the box, a latch pivotally mounted adjacent the lower end of said box for releasably holding said door in closed position, forwardly opening hook members on the lift arms for detachably engaging the lift pins, means maintaining the box level as it is being lifted, means operable from the vehicle for tilting said box to dump it, a link pivotally connected at one end to a side of said box with the free end of said link in position to be engaged by the adjacent hook member upon tilting said box with respect to said lift arms and a second link pivotally connecting the first mentioned link to latch for releasing the same and holding it in released position during engagement of said first mentioned link with the hook member.

References Cited in the file of this patent

UNITED STATES PATENTS

| | | |
|---|---|---|
| 1,177,347 | Mayer | Mar. 28, 1916 |
| 1,628,389 | Cochran | May 10, 1927 |

FOREIGN PATENTS

| | | |
|---|---|---|
| 4440/26 | Australia | Oct. 27, 1926 |